US009609235B2

United States Patent
Sano

(10) Patent No.: US 9,609,235 B2
(45) Date of Patent: Mar. 28, 2017

(54) DIGITAL CAMERA, INFORMATION PROCESSING METHOD, AND COMPUTER PROGRAM

(71) Applicant: NIKON CORPORATION, Tokyo (JP)

(72) Inventor: Hisashi Sano, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 14/425,461

(22) PCT Filed: Sep. 3, 2013

(86) PCT No.: PCT/JP2013/073664
§ 371 (c)(1),
(2) Date: Jul. 14, 2015

(87) PCT Pub. No.: WO2014/034945
PCT Pub. Date: Mar. 6, 2014

(65) Prior Publication Data
US 2015/0350564 A1    Dec. 3, 2015

(30) Foreign Application Priority Data

Sep. 3, 2012 (JP) .................................. 2012-192911

(51) Int. Cl.
*H04N 5/262* (2006.01)
*H04N 5/232* (2006.01)
*H04N 9/04* (2006.01)
*H04N 5/77* (2006.01)

(52) U.S. Cl.
CPC ....... *H04N 5/2621* (2013.01); *H04N 5/23293* (2013.01); *H04N 5/77* (2013.01); *H04N 9/045* (2013.01)

(58) Field of Classification Search
CPC    H04N 1/60; H04N 1/62; H04N 5/228; H04N 9/873; H04N 9/73
See application file for complete search history.

(56) References Cited

U.S. PATENT DOCUMENTS

| 5,255,083 A | 10/1993 | Capitant et al. |
| 5,646,750 A | 7/1997 | Collier |
| 6,791,716 B1 | 9/2004 | Buhr et al. |
| 6,873,730 B2 * | 3/2005 | Chen ..................... H04N 1/628 382/167 |

(Continued)

FOREIGN PATENT DOCUMENTS

| JP | H05-260500 A | 10/1993 |
| JP | 2001-285889 A | 10/2001 |

(Continued)

OTHER PUBLICATIONS

Dec. 10, 2013 Search Report issued in International Patent Application No. PCT/JP2013/073664.

*Primary Examiner* — James Hannett
(74) *Attorney, Agent, or Firm* — Oliff PLC

(57) ABSTRACT

A digital camera includes: a RAW data conversion unit that converts pixel values of respective colors of RAW data into values corresponding to predetermined spectral characteristics; and an output image conversion unit that converts the values corresponding to the spectral characteristics converted in the RAW data conversion unit, into predetermined output image data.

6 Claims, 16 Drawing Sheets

(56) References Cited

U.S. PATENT DOCUMENTS

| | | | | |
|---|---|---|---|---|
| 2003/0053085 A1* | 3/2003 | Takemoto | ............ | H04N 1/6022 358/1.9 |
| 2006/0232685 A1* | 10/2006 | Takemoto | ................ | H04N 1/60 348/223.1 |
| 2009/0268041 A1* | 10/2009 | Chou | ................ | H04N 5/23248 348/208.6 |
| 2012/0033937 A1* | 2/2012 | Kim | .................... | G11B 27/034 386/230 |

FOREIGN PATENT DOCUMENTS

| | | | |
|---|---|---|---|
| JP | 2001-346218 A | 12/2001 | |
| JP | 2011-024202 A | 2/2011 | |

\* cited by examiner

DIGITAL CAMERA, INFORMATION PROCESSING METHOD, AND COMPUTER PROGRAM

TECHNICAL FIELD

The present invention relates to a digital camera, an information processing method, and a computer program.

BACKGROUND ART

Currently, digital cameras which record images with image-capturing elements become popular, in place of conventional film cameras which capture images with films. In most cases, the digital camera obtains an image signal having three colors, RGB, by photoelectrically converting light transmitting through a three color (RGB) filter with the image-capturing element. The digital camera performs conversions such as Bayer interpolation, white balance conversion, matrix conversion, and gamma conversion on the obtained image signal to convert the signal into image data optimized for viewing on a display. The converted image data is recorded in a file format, such as JPEG.

In the case of photography with a conventional film, the film is loaded in a camera to perform photography and then develop the film. Thereafter, image reproduction is performed by printing or by projection with a projector. Although digital cameras are popular in recent years, an appearance resulting from the image reproduction with the conventional film may sometimes be desired. In order to meet this need, digital cameras or application softwares may be provided with a mode intended for film tone reproduction. In order to perform such a reproduction, an image processing device has been proposed which is able to perform a conversion on an image photographed by a digital camera to obtain a film tone image, for example (see PTL1).

In order to obtain a film tone image, the image processing device sequentially performs white balance processing, color conversion matrix processing, and gradation conversion processing on the image which has been photographed by a digital camera and has been subjected to Bayer interpolation processing. In the image processing device, the white balance processing, the color conversion matrix processing, and the gradation conversion processing are performed with parameters of respective processing optimized to achieve the film tone reproduction.

CITATION LIST

Patent Literature

PTL1: Japanese Laid-Open Patent Publication No. 2001-346218

SUMMARY OF INVENTION

Technical Problem

It is desired to reproduce a reversal film tone appearance with even higher accuracy than the above-described conventional art.

Solution to Problem

A digital camera according to a first aspect of the present invention comprises: a RAW data conversion unit that converts pixel values of respective colors of RAW data into values corresponding to predetermined spectral characteristics; and an output image conversion unit that converts the values corresponding to the spectral characteristics converted in the RAW data conversion unit, into predetermined output image data.

According to a second aspect of the present invention, in the digital camera according to the first aspect, it is preferable that the predetermined spectral characteristics are spectral characteristics of respective dyes in a transparency.

According to a third aspect of the present invention, in the digital camera according to the second aspect, it is preferable that the transparency is a photographic film.

An information processing method according to a fourth aspect of the present invention comprises: a RAW data conversion step of converting pixel values of respective colors of RAW data into values corresponding to predetermined spectral characteristics; an output image conversion step of converting the values corresponding to the spectral characteristics converted in the RAW data conversion step, into predetermined output image data.

According to a fifth aspect of the present invention, in the information processing method according to the fourth aspect, it is preferable that in the RAW data conversion step, a logarithmic transformation is performed on the pixel values of respective colors of the RAW data to output logarithmic transformation values and the logarithmic transformation values are converted into density parameters indicating densities of respective dyes in a transparency; and in the output image conversion step, the density parameters converted in the RAW data conversion step are converted into the predetermined output image data.

According to a sixth aspect of the present invention, in the information processing method according to the fifth aspect, it is preferable that in the output image conversion step, spectral density characteristics of the transparency corresponding to the density parameters are calculated and the output image data is calculated based on the spectral density characteristics of the transparency.

According to a seventh aspect of the present invention, in the information processing method according to any one of the fourth to sixth aspects, it is preferable that the output image data is device-dependent image data or device-independent image data.

According to an eighth aspect of the present invention, in the information processing method according to the fifth or sixth aspect, it is preferable that in the RAW data conversion step, the logarithmic transformation values are converted into the density parameters with predetermined conversion information; and the conversion information is formed based on photographed data obtained by photographing a color patch with a digital camera and colorimetric data obtained by performing colorimetry on the transparency used for photographing the color patch.

An information processing method according to a ninth aspect of the present invention, that creates a look-up table for accepting input of RAW data captured by a digital camera and converting the RAW data into predetermined color data, comprises: a logarithmic transformation step of performing a logarithmic transformation on input values of the look-up table to output logarithmic transformation values; a density parameter conversion step of converting the logarithmic transformation values output in the logarithmic conversion step, into density parameters indicating densities of respective dyes in a transparency; a color data conversion step of converting the density parameters converted in the density parameter conversion step, into device-dependent or device-independent color data; and a look-up table creation step of creating the look-up table, wherein the color data converted in the color data conversion step is set as an output value of the look-up table.

According to a tenth aspect of the present invention, in the digital camera according to the first aspect, it is preferable that the RAW data conversion unit performs a logarithmic transformation on the pixel values of respective colors of the RAW data to output logarithmic transformation values and converts the logarithmic transformation values into density parameters indicating densities of respective dyes in a transparency; and the output image conversion unit converts the density parameters converted in the RAW data conversion unit, into predetermined output image data.

A digital camera according to an eleventh aspect of the present invention comprises: an image-capture unit that captures a subject image; a logarithmic transformation unit that performs a logarithmic transformation on RAW data captured by the image-capture unit to output logarithmic transformation values; a density parameter conversion unit that converts the logarithmic transformation values output by the logarithmic transformation unit into density parameters indicating densities of respective dyes in a transparency; and a record control unit that records the density parameters converted in the density parameter conversion unit in a storage medium.

An information processing method according to a twelfth aspect of the present invention, comprises: a RAW data input step of inputting RAW data captured by a digital camera; a logarithmic transformation step of performing a logarithmic transformation on the RAW data input in the RAW data input step to output logarithmic transformation values; a density parameter conversion step of converting the logarithmic transformation values output in the logarithmic transformation step into density parameters indicating densities of respective dyes in a transparency; and a storage step of storing the density parameters converted in the density parameter conversion step in a recording medium.

An information processing method according to a thirteenth aspect of the present invention comprises: a density parameter input step of inputting density parameters indicating densities of respective dyes in a transparency; a spectral density characteristic calculation step of calculating spectral density characteristics of the transparency corresponding to the density parameters input in the density parameter input step; and an output image calculation step of calculating predetermined output image data, based on the spectral density characteristics of the transparency calculated in the spectral density characteristic calculation step.

An information processing method according to a fourteenth aspect of the present invention that creates a look-up table for accepting input of density parameters indicating densities of respective dyes in a transparency and converting the density parameters into predetermined color data, comprises: a density parameter input step of inputting the density parameters; a spectral density characteristic calculation step of calculating spectral density characteristics of the transparency corresponding to the density parameters input in the density parameter input step; a color data conversion step of converting the spectral density characteristics of the transparency calculated in the spectral density characteristic calculation step, into device-dependent or device-independent color data; and a look-up table creation step of creating the look-up table, wherein the color data converted in the color data conversion step is set as an output value of the look-up table.

A digital camera according to a fifteenth aspect of the present invention comprises: an image-capture unit that captures a subject image; a storage unit that stores conversion parameters for converting logarithmic transformation values, which are output by performing a logarithmic transformation on RAW data captured by the image-capture unit, into density parameters indicating densities of respective dyes in a transparency; and a record control unit that records the RAW data captured by the image-capture unit and the conversion parameters, in correlation with each other, in a storage medium.

According to a sixteenth aspect of the present invention, in the information processing method according to the fifth aspect, it is preferable that in the RAW data conversion step, the logarithmic transformation is performed on the pixel values of respective colors of the RAW data recorded in the storage medium by the digital camera according to the fifteenth aspect to output the logarithmic transformation values, and the logarithmic transformation values are converted into the density parameters with the conversion parameters.

According to a seventeenth aspect of the present invention, in the information processing method according to the ninth aspect, it is preferable to further comprise: a conversion parameter input step of inputting the conversion parameters recorded in the storage medium by the digital camera according to the fifteenth aspect, wherein: in the density parameter conversion step, the conversion parameters input in the conversion parameter input step is used to convert the logarithmic transformation values output in the logarithmic transformation step into the density parameters.

According to an eighteenth aspect of the present invention, in the information processing method according to the ninth or seventeenth aspect, it is preferable to further comprise: a RAW data input step of inputting RAW data captured by the digital camera; and an image conversion step of converting the RAW data input by the RAW data input step with the look-up table created in the look-up table creation step.

According to a nineteenth aspect of the present invention, in the information processing method according to the fourth aspect, it is preferable that in the RAW data conversion step, the pixel values of respective colors of the RAW data are converted into transmittance parameters indicating transmittances of respective dyes in a transparency; and in the output image conversion, the transmittance parameters converted in the RAW data conversion step is converted into the predetermined output image data.

According to a twentieth aspect of the present invention, in the digital camera according to the first aspect, it is preferable that the RAW data conversion unit converts the pixel values of respective colors of the RAW data into transmittance parameters indicating transmittances of respective dyes in a transparency; and the output image conversion unit converts the transmittance parameters converted in the RAW data conversion unit, into the predetermined output image data.

A computer program according to a twenty-first aspect of the present invention causes a computer to execute the information processing method according to any one of the fourth to ninth, twelfth to fourteenth, and sixteenth to nineteenth aspects.

Advantageous Effects of Invention

According to the present invention, a transparent film tone appearance can be accurately reproduced from an image captured by a digital camera.

DESCRIPTION OF EMBODIMENTS

First Embodiment

Figure 1:
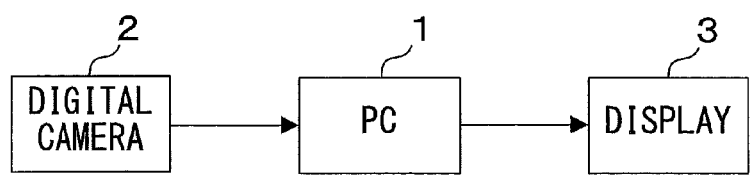
FIG. 1 A view illustrating an example of a configuration of an image processing system.

A first embodiment of the present invention will be described in reference to the drawings. FIG. 1 is a view illustrating a configuration of an image processing system according to the first embodiment. A personal computer (a PC) 1 is connected to external devices, such as a digital camera 2 and a display 3, via a connection interface.

In this embodiment, the PC 1 is configured to perform an image processing for transforming or converting photographed image data acquired by the digital camera 2 into an image having a similar appearance to an image reproduced by a reversal file or positive film (a photographic film), i.e. a reversal film tone image, and output the image to the display 3. This image processing will be described hereinafter in detail.

—Configuration of PC—

Figure 2:
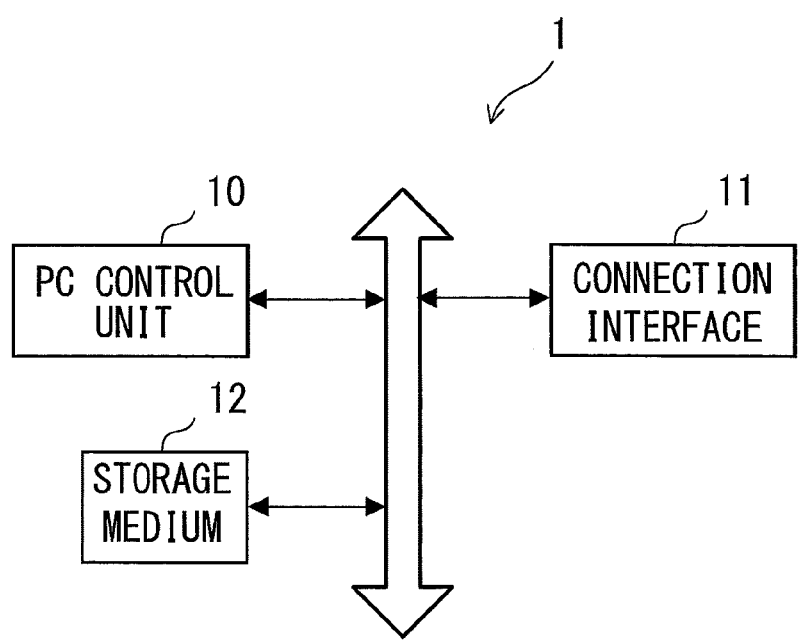
FIG. 2 A block diagram illustrating an example of a configuration of a personal computer.

FIG. 2 is a block diagram illustrating an example of a configuration of the PC 1. The PC 1 includes a PC control unit 10, a connection interface 11, and a storage medium 12 such as a hard disk. The PC 1 is connected to external devices, such as the digital camera 2 and the display 3, via the connection interface 11. The connection interface 11 includes an USB interface for wired connection or a wireless LAN module for wireless connection, for example. The PC control unit 10 is constructed by a CPU, a memory, and other peripheral circuits, and runs a program stored in the memory to control operations of the PC 1.

The PC control unit 10 takes in images photographed by the digital camera 2 from a memory card 26 (FIG. 3) attached to the digital camera 2 via the connection interface 11. The PC control unit 10 may take in images photographed by the digital camera 2 via a card interface (not shown) if a memory card having the images photographed by the digital camera 2 stored therein is attached to the PC 1.

—Configuration of Digital Camera—

Figure 3:
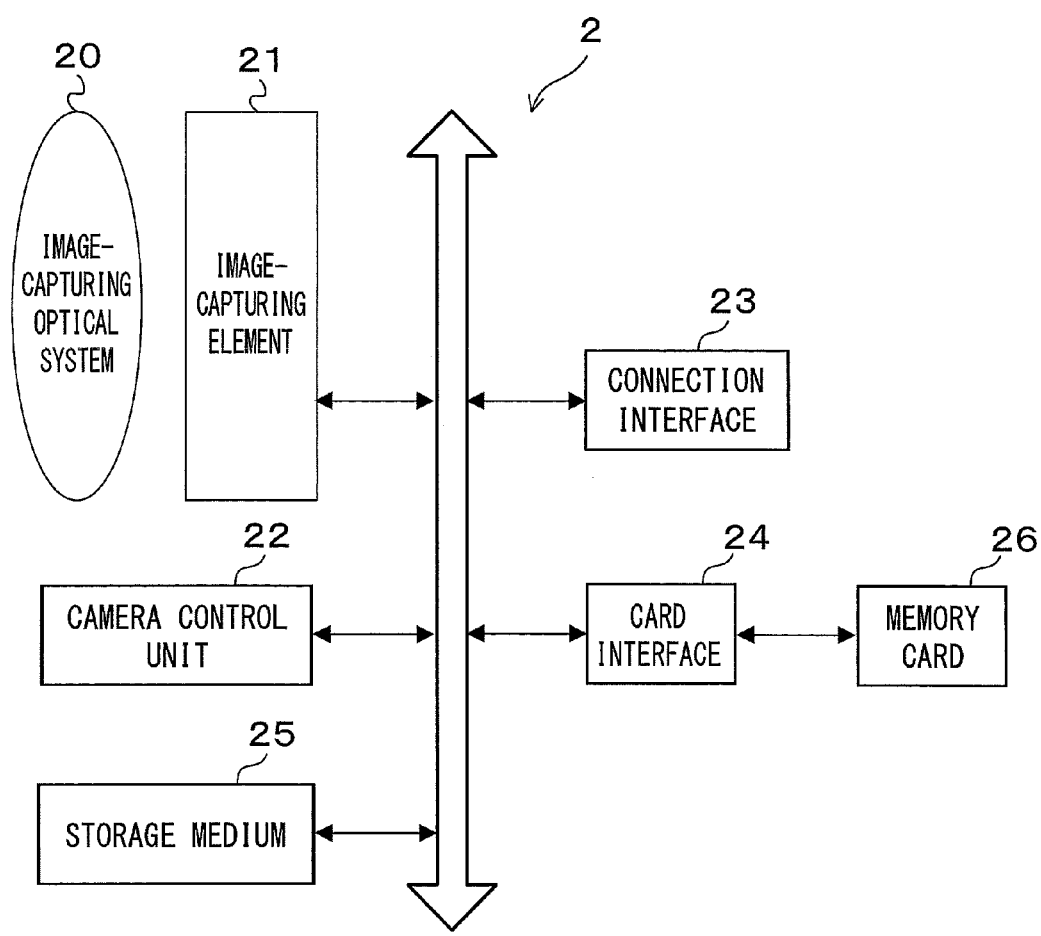
FIG. 3 A block diagram illustrating an example of a configuration of a digital camera.

FIG. 3 is a block diagram illustrating an example of a configuration of the digital camera 2. The digital camera 2 includes an image-capturing optical system 20, an image-capturing element 21, a camera control unit 22, a connection interface 23, a card interface 24, and a storage medium 25. The memory card 26, which is a removable recording medium, is attached to the card interface 24.

The digital camera 2 is connected to external devices such as the PC 1 (FIG. 1) via the connection interface 23. The connection interface 23 includes an USB interface for wired connection or a wireless LAN module for wireless connection, for example.

The camera control unit 22 is constructed by a CPU, a memory, and other peripheral circuits, and runs a program stored in the memory to control operations of the digital camera 2.

The image-capturing optical system 20 is constructed by a plurality of lens groups including a zoom lens and a focusing lens, and it forms an image of a subject onto a light receiving surface of the image-capturing element 21. It will be noted that the image-capturing optical system 20 is shown as a single lens in FIG. 3, for the sake of simplicity.

The image-capturing element 21 is constructed by, for instance, a CMOS image sensors. The image-capturing element 21 generates an image signal by an photoelectric conversion of the subject image. The light receiving surface of the image-capturing element 21 is provided with a well-known mosaic color filter. The mosaic color filter is a color separation filter in which primary color filters which transmit red (R), blue (B), or green (G) light are arranged in a mosaic-like array (for example, Bayer array), in correlation with pixel positions. The image-capturing element 21 captures the subject image through this color filter to output a color image signal for each of three primary colors of light.

The image signal generated by the image-capturing element 21 is converted to a digital signal with an A/D conversion unit (not shown) and output to the camera control unit 22 as RAW data. The camera control unit 22 only performs a Bayer interpolation processing on the RAW data to record the data in the memory card 26 via the card interface 24.

—Image Processing for Conversion to Reversal Film Tone Image—

An image processing for conversion to a reversal film tone image as described above will now be described. Image reproduction for a reversal film will first be considered. The reversal film has a cyan dye layer, a magenta dye layer, a yellow dye layer, and a base layer. Accordingly, it can be considered that the color after development of the reversal film is dependent on spectral density characteristics of the cyan, magenta, and yellow dyes and a spectral density characteristic of the base. Therefore, given that the spectral density characteristic of the cyan layer is $Dc(\lambda)$, the spectral density characteristic of the magenta layer is $Dm(\lambda)$, the spectral density characteristic of the yellow layer is $Dy(\lambda)$, and the spectral density characteristic of the base is $Db(\lambda)$, an overall spectral density characteristic $D(\lambda)$ of the reversal film can be expressed by the following equation (1).

$$D(\lambda)=Dc(\lambda)+Dm(\lambda)+Dy(\lambda)+Db(\lambda) \qquad (1)$$

The spectral density characteristic $Db(\lambda)$ of the base is always constant, irrespective of types of subjects to be photographed. On the other hand, the spectral density characteristics of the cyan, magenta, and yellow layers $Dc(\lambda)$, $Dm(\lambda)$, and $Dy(\lambda)$, respectively, are components that vary depending on subjects, and these components mainly make up the color of the image. For example, the spectral density characteristic of the cyan layer $Dc(\lambda)$ has generally a large value if the intensity of the blue component in the color of the photographed subject is high, while the spectral density characteristics of the magenta and yellow layers $Dm(\lambda)$ and $Dy(\lambda)$, respectively, have generally large values if the intensity of the red component of the color is high.

Therefore, in order to determine the color after development of the reversal film, it is generally important to know how the spectral density characteristics of the cyan, magenta, and yellow layers $Dc(\lambda)$, $Dm(\lambda)$, and $Dy(\lambda)$, respectively, vary depending on the intensity of the color of the subject.

Figure 4:
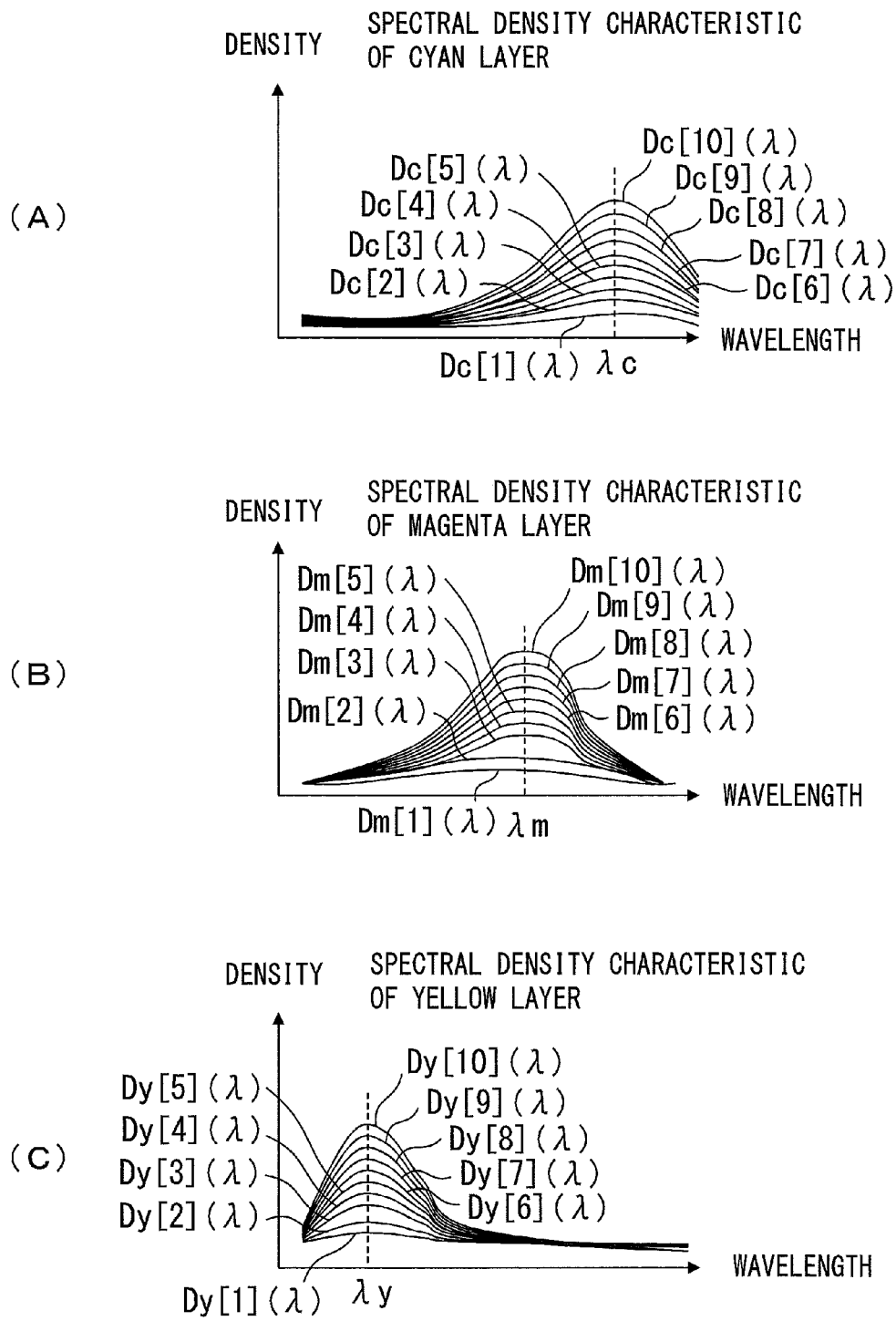
FIG. 4(A) is a view illustrating a spectral density characteristic of the cyan layer.
FIG. 4(B) is a view illustrating a spectral density characteristic of the magenta layer.
FIG. 4(C) is a view illustrating a spectral density characteristic of the yellow layer.

In order to know this, the reversal film may be exposed and developed with change in density of one of the dyes, in order to create a chart and perform spectral measurement of the chart. Consequently, the spectral density characteristics of the dyes can be determined. As an example, results of creating the chart having ten stages of densities for each color and performing the spectral measurement of the charts are shown in FIG. 4. FIG. 4(A) illustrates a result of the spectral measurement of the chart of cyan, FIG. 4(B) illustrates a result of the spectral measurement of the chart of magenta, and FIG. 4(C) illustrates a result of the spectral measurement of the chart of yellow. It will be noted that the results illustrated in FIG. 4 represent only concepts, not actually measured values. Also in FIG. 4, the spectral density characteristics of densities in the cyan layer are respectively denoted by $Dc[1](\lambda)$ through $Dc[10](\lambda)$, the spectral density characteristics of densities in the magenta layer are respectively denoted by $Dm[1](\lambda)$ through $Dm[10](\lambda)$, and the spectral density characteristics of densities in the yellow layer are respectively denoted by $Dy[1](\lambda)$ through $Dy[10](\lambda)$. Here, [1] through [10] denote numbers (indices) of curves of the spectral density characteristics illustrated in FIG. 4 and a larger value corresponds to a higher density.

A case will now be considered in which a spectral density characteristic $Dc(C, \lambda)$ of the cyan layer with a density parameter C indicating the density of the cyan layer is determined. The density parameter C indicates a density value of the cyan layer at a wavelength $\lambda c$ (for example, 660 nm) which is a peak density. For example, assuming that the density value at the wavelength $\lambda c$ in $Dc[9](\lambda)$ illustrated in FIG. 4 is 1.8 (i.e. $Dc[9](\lambda c)=1.8$), the spectral density characteristic $Dc(1.8, \lambda)$ with the density parameter C=1.8 is exactly equal to $Dc[9](\lambda)$. Furthermore, for example, assuming that the density value at the wavelength $\lambda c$ in $Dc[10](\lambda)$ illustrated in FIG. 4 is 2.0 (i.e. $Dc[10](\lambda c)=2.0$), the spectral density characteristic $Dc(2.0, \lambda)$ with the density parameter C=2.0 is exactly equal to $Dc[10](\lambda)$.

Furthermore, if $1.8<C<2.0$ (i.e. $Dc[9](\lambda c)<C<Dc[10](\lambda)$), the spectral density characteristic $Dc(C, \lambda)$ with the density parameter C can be determined in an approximate manner with $Dc[9](\lambda)$ and $Dc[10](\lambda)$. For example, the spectral density characteristic $Dc(1.9, \lambda)$ with the density parameter C=1.9 can be determined in an approximate manner by the following equation.

$$Dc(1.9,\lambda)=?Dc[9](\lambda)?+?[(1.9-1.8)/(2.0-1.8)]\cdot[Dc[10](\lambda)-Dc[9](\lambda)]$$

In this way, the spectral density characteristic $Dc(C, \lambda)$ of the cyan layer with a given density parameter C can be determined in an approximate manner by the following equation (2), by finding and using $Dc[i](\lambda)$ and $Dc[i+1](\lambda)$ among the spectral density characteristics $Dc[1](\lambda)$-$Dc[10](\lambda)$ measured in advance so that $Dc[i](\lambda c)<C<Dc[i+1](\lambda c)$. In the following equation (2), $Dc[i](\lambda c)=C1$ and $Dc[i+1](\lambda c)=C2$.

$$Dc(C,\lambda)=Dc[i](\lambda)+[(C-C1)/(C2-C1)]\cdot[Dc[i+1](\lambda)-Dc[i](\lambda)] \qquad (2)$$

Similarly, a spectral density characteristic $Dm(M, \lambda)$ of the magenta layer with a density parameter M indicating the density of the magenta layer can be determined in an approximate manner with $Dm[1](\lambda)$ through $Dm[10](\lambda)$ measured in advance. Here, the density parameter M indicates a density value of the magenta layer at a wavelength $\lambda m$ (for example, 540 nm) which is a peak density. Similarly, a spectral density characteristic $Dy(Y, \lambda)$ of the yellow layer with a density parameter Y indicating the density of the yellow layer can also be determined in an approximate manner with $Dy[1](\lambda)$ through $Dy[10](\lambda)$ measured in advance. Here, the density parameter Y indicates a density value of the yellow layer at a wavelength $\lambda y$ (for example, 440 nm) which is a peak density.

Thus, the spectral density characteristics $Dc(\lambda)$, $Dm(\lambda)$, and $Dy(\lambda)$ of the dyes corresponding to respective density parameters C, M, and Y can be determined from the density parameters C, M, and Y indicating the densities of respective colors (cyan, magenta, and yellow). The overall spectral density characteristic $D(\lambda)$ of the reversal film can then be determined with the above-described equation (1).

Then, by determining an observation light source, tristimulus values X, Y and Z which represent an appearance can be calculated by the following equations (3) to (5), based on the spectral characteristics $I(\lambda)$ of the observation light source and the overall spectral density characteristic $D(\lambda)$ of the reversal film. In the following equations (3) to (5), $x(\lambda)$, $y(\lambda)$, and $z(\lambda)$ denote color matching functions.

$$X=\int\{I(\lambda)\cdot 10^{(-D(\lambda))}\cdot x(\lambda)\}d\lambda \qquad (3)$$

$$Y=\int\{I(\lambda)\cdot 10^{(-D(\lambda))}\cdot y(\lambda)\}d\lambda \qquad (4)$$

$$Z=\int\{I(\lambda)\cdot 10^{(-D(\lambda))}\cdot z(\lambda)\}d\lambda \qquad (5)$$

Therefore, in order to convert the image photographed by the digital camera 2 into a reversal film tone, the image data photographed by the digital camera 2 may be transformed into density parameters C, M, and Y indicating densities of the respective colors (cyan, magenta, and yellow). Once the density parameters C, M, and Y of the respective colors are determined, the spectral density characteristics $Dc(\lambda)$, $Dm(\lambda)$, and $Dy(\lambda)$ of the respective colors and thus the overall spectral density characteristic $D(\lambda)$ of the reversal film are determined and consequently the tristimulus values X, Y, and Z are determined. Therefore, by converting the tristimulus values X, Y, and Z into a color space dependent on an output device (for example, the display 3), the reversal film tone image converted from the photographed image of the digital camera 2 can be output to an output device. In this way, the reversal film tone image can be reproduced from the image data photographed by the digital camera 2, in consideration of physical characteristics of the reversal film.

In this embodiment, a conversion matrix for converting the image data (RAW data) photographed by the digital camera 2 into the density parameters C, M, and Y of the respective colors (cyan, magenta, and yellow) has been previously created. The term "RAW data" as used in this embodiment refers to image data that has been subjected to only the Bayer interpolation processing and has not been subjected to white balance conversion, color matrix conversion, gradation conversion, and the like.

The term "RAW data" also refers to (linear) image data having a linearity as a function of the amount of light. The term "density" refers to a result of a common logarithmic transformation on the reciprocal of reflectance (or transmittance) of light. In view of the foregoing description, in this embodiment, RGB values of the RAW data are converted into a logarithmic space that is similar to the space of density, by performing the common logarithmic transformation on the RGB values. In the following equations (6) to (8), $R_{10}$, $G_{10}$, and $B_{10}$ denote values after this conversion.

$$R_{10} = \mathrm{Log}_{10} R \quad (6)$$

$$G_{10} = \mathrm{Log}_{10} G \quad (7)$$

$$B_{10} = \mathrm{Log}_{10} B \quad (8)$$

Then, a density conversion matrix for converting values $R_{10}$, $G_{10}$, and $B_{10}$ after the above-described conversion, into the density parameters C, M, and Y of the respective colors (cyan, magenta, and yellow) is created. Specifically, the conversion from $R_{10}$, $G_{10}$, and $B_{10}$ into C, M, and Y is performed with the following equation (9). In the following equation (9), factors m1 to m9 are parameters of the conversion matrix and factors n1 to n3 are offset amounts. The offset amounts are amounts in accordance with normalization of values.

[Math. 1]

$$\begin{pmatrix} C \\ M \\ Y \end{pmatrix} = \begin{pmatrix} m1 & m2 & m3 \\ m4 & m5 & m6 \\ m7 & m8 & m9 \end{pmatrix} \begin{pmatrix} R_{10} \\ G_{10} \\ B_{10} \end{pmatrix} + \begin{pmatrix} n1 \\ n2 \\ n3 \end{pmatrix} \quad (9)$$

A color chart having a plurality of color patches is photographed with both the reversal film and the digital camera 2, so that the factors m1 to m9 and n1 to n3 can be optimized based on both a spectrocolorimetric data of the reversal film after development and an image data photographed by the digital camera 2.

Photography with the reversal film will first be considered. As described above, the overall spectral density characteristic $D(\lambda)$ of the reversal film can be expressed by the equation (1) and determined by the density parameters C, M, and Y of the respective colors. It is assumed here that the $Dp(\lambda)$ denotes the result of performing colorimetry on a certain color patch with a spectral densitometer, after the color chart is photographed with the reversal film and the reversal film is then developed. Then, C, M, and Y in the target color patch can be determined so that $Dp(\lambda)$ and $D(\lambda)$ are closest to each other. The values of C, M, and Y can be determined so that F calculated by the following equation (10) has its minimum value, wherein F is a difference between $Dp(\lambda)$ and $D(\lambda)$, for example.

$$F = \Sigma |D(\lambda) - Dp(\lambda)| \quad (10)$$

On the other hand, for photography with the digital camera 2, $R_{10}$, $G_{10}$, and $B_{10}$ in a color patch can be determined by acquiring RAW data (RGB) in the color patch when the color chart is photographed with the digital camera 2 and performing a logarithmic transformation on the RAW data with the equations (6) to (8).

In this way, for one color patch, a set of C, M, Y and $R_{10}$, $G_{10}$, $B_{10}$ can be obtained. By photographing a plurality of color patches, a plurality of sets of C, M, Y and $R_{10}$, $G_{10}$, $B_{10}$ can be obtained. Based on the plurality of sets of C, M, Y and $R_{10}$, $G_{10}$, $B_{10}$, the factors m1 to m9 and n1 to n3 in the equation (9) can thus be determined. Specifically, the factors m1 to m9 and n1 to n3 are optimized with a least-squares method or the like so that the difference is small between C, M, Y obtained by converting $R_{10}$, $G_{10}$, and $B_{10}$ with the equation (9), wherein $R_{10}$, $G_{10}$, and $B_{10}$ are obtained by photographing a color patch with the digital camera 2 and performing a logarithmic transformation on data of the color patch, and C, M, Y determined by photographing the color patch with the reversal film and performing colorimetry on the color patch.

In this embodiment, the thus created equation (9) (the density conversion matrix) for converting $R_{10}$, $G_{10}$, and $B_{10}$, which are the results of the logarithmic transformation on the RGB values of the RAW data, into the density parameters C, M, and Y of the respective colors has been previously stored in the storage medium 12 of the PC 1. The spectral density characteristics $Dc(\lambda)$, $Dm(\lambda)$, and $Dy(\lambda)$ of the respective dyes (cyan, magenta, and yellow) and the spectral density characteristic $Db(\lambda)$ of the base of the reversal film with a plurality of stages of density parameters (referred to as spectral density characteristic information, hereinafter) have also been previously stored. Then, the PC 1 uses the information stored in the storage medium 12 to perform an image processing for converting the image data photographed by the digital camera 2 into a reversal film tone image.

The sequence of the image processing will now be described in reference to a flowchart illustrated in FIG. 5. Here, a computer program for causing the PC control unit 10 to execute the image processing has been stored in a memory (not shown) in the PC control unit 10, for example. The image processing is performed on the image data photographed by the digital camera 2, pixel by pixel, for example.

In step S1, the PC control unit 10 inputs RAW data (RGB values) of a pixel to be processed, and proceeds to step S2.

It step S2, the PC control unit 10 performs the logarithmic transformation on the RAW data (the RGB values) input in step S1 with the above-described equations (6) to (8), and proceeds to step S3.

It step S3, the PC control unit 10 converts the image data ($R_{10}$, $G_{10}$, and $B_{10}$) transformed in step S2 into the density parameters C, M, and Y in the pixel to be processed, by the above-described equation (9), and proceeds to step S4.

In step S4, the PC control unit 10 uses the density parameters C, M, and Y converted in step S3 and the spectral density characteristic information stored in the storage medium 12 to calculate the spectral density characteristics $Dc(\lambda)$, $Dm(\lambda)$, and $Dy(\lambda)$ of the respective colors in the pixel to be processed, by the above-described equation (2), and proceeds to step S5.

In step S5, the PC control unit 10 uses the calculation result from step S4 to calculate the overall spectral density characteristic $D(\lambda)$ of the reversal film in the pixel to be processed, by the above-described equation (1).

In step S6, the PC control unit 10 uses the spectral density characteristic $D(\lambda)$ calculated in step S5 to calculate the tristimulus values X, Y, and Z in the pixel to be processed, by the above-described equations (3) to (5). Here, the observation light source established for the calculation of the tristimulus values X, Y, and Z may be daylight, for example $D_{50}$. Furthermore, assuming that the reversal film is projected on a screen with a projector for viewing, the observation light source may be a light source of the projector or may be a light source provided in consideration of both the light source of the projector and a spectral reflectance of the screen.

In step S7, the PC control unit 10 converts the calculated tristimulus values X, Y, and Z in step S6 into a (device-dependent) color space (RGB) which is dependent on the display 3, with the following equation (11). In the following equation (11), $R_1$, $G_1$, and $B_1$ denote values of the color space dependent on the display 3. Factors a1-a9 can be determined from characteristics of the primary colors of the display 3.

[Math. 2]

$$\begin{pmatrix} R_1 \\ G_1 \\ B_1 \end{pmatrix} = \begin{pmatrix} a1 & a2 & a3 \\ a4 & a5 & a6 \\ a7 & a8 & a9 \end{pmatrix} \begin{pmatrix} X \\ Y \\ Z \end{pmatrix} \quad (11)$$

Then, the PC control unit 10 performs a gamma conversion on the values ($R_1$, $G_1$, and $B_1$), which have been converted into the color space (RGB) dependent on the display 3, with the following equations (12) to (14). Then, the processing in FIG. 5 is ended. In the following equations (12) to (14), $R_2$, $G_2$, and $B_2$ denote values after the gamma conversion. A function f can be determined from gamma characteristics of the display 3.

$$R_2 = f(R_1) \quad (12)$$

$$G_2 = f(G_1) \quad (13)$$

$$B_2 = f(B_1) \quad (14)$$

Figure 5:
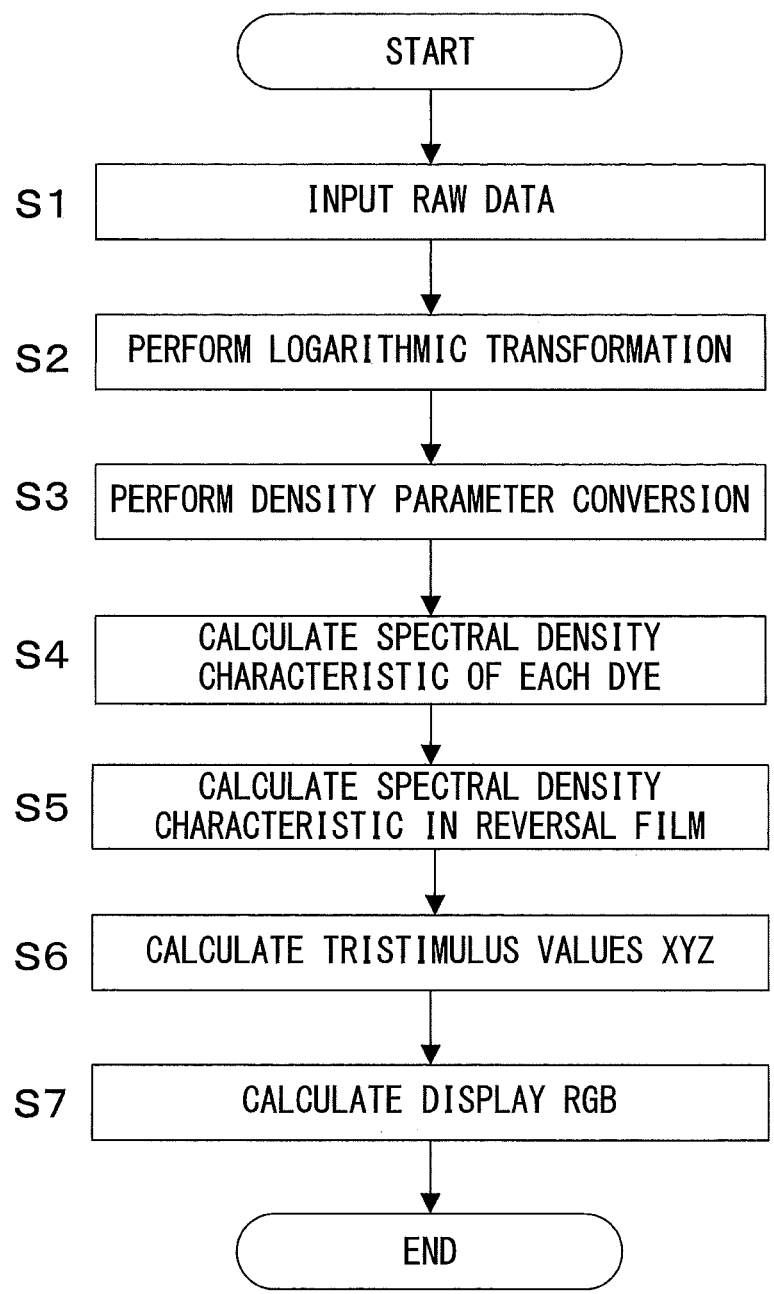
FIG. 5 A flowchart illustrating an image processing.

The PC control unit 10 outputs the image data obtained by the processing in FIG. 5 to the display 3. As a result, the image photographed by the digital camera 2 is converted into a reversal film tone and the image is displayed on the display 3.

According to the first embodiment as described above, the following operational advantages can be achieved.

(1) A computer program is configured to cause the computer (PC control unit 10) to execute a RAW data input step of inputting RAW data captured by the digital camera 2; a logarithmic transformation step of performing a logarithmic transformation on the RAW data input in the RAW data input step to output logarithmic transformation values ($R_{10}$, $G_{10}$, and $B_{10}$); a density parameter conversion step of converting the logarithmic transformation values output in the logarithmic transformation step into density parameters (C, M, and Y) indicating the densities of respective dyes in a transparent film or transparency (a reversal film); and an image output step of converting the density parameters converted in the density parameter conversion step into predetermined output image data (RGB data dependent on a display). By performing the logarithmic transformation on the RAW data photographed by the digital camera 2 in this way, the conversion into the reversal film tone image can be performed in a logarithmic space similar to that of the reversal film. Therefore, a reversal film tone appearance can be reproduced with a higher accuracy than conventional approaches.

(2) In the computer program described in the item (1), the above-described image output step is configured to include a spectral density characteristic calculation step of calculating the spectral density characteristic $D(\lambda)$ of the transparent film (the reversal film) corresponding to the converted density parameters (C, M, and Y) in the density parameter conversion step; and an output image calculation step of calculating output image data (RGB data dependent on the display), based on the calculated spectral density characteristic $D(\lambda)$ of the transparent film in the spectral density characteristic calculation step. Thereby, the photographed image data of the digital camera 2 can be converted into a reversal film tone image, in consideration of physical characteristics of the reversal film. Therefore, a reversal film tone appearance can be reproduced with higher accuracy than conventional approaches.

(3) In the computer program described in the item (1) or (2), the density parameter conversion step is configured so that the logarithmic transformation values are converted into the density parameters (C, M, and Y) with predetermined conversion information (a density conversion matrix), wherein the conversion information is created based on photographed data obtained by photographing the color patch with the digital camera 2 and colorimetric data obtained by performing colorimetry on the transparent film (the reversal film) used for photographing the color patch. In this way, the RAW data photographed by the digital camera 2 can be properly converted into density parameters (C, M, and Y).

Second Embodiment

In a second embodiment, a case will be described in which a LUT (Look?Up?Table) is created for converting RAW data into a reversal film tone image as in the first embodiment described above. In the second embodiment, the description of the same parts as in the first embodiment will be omitted.

The PC control unit 10 executes a reversal film conversion LUT creation processing of creating a three-dimensional LUT (referred to as a reversal film conversion LUT, hereinafter) that accepts input of RAW data (RGB values) and converts the RAW data into a reversal film tone image as in the first embodiment described above and outputs the image as a L*a*b* value of a device-independent color space. Here, a computer program for causing the PC control unit 10 to execute the reversal film conversion LUT creation processing has been stored in a memory (not shown) in the PC control unit 10, for example.

In the reversal film conversion LUT creation processing, the PC control unit 10 first creates input values for the reversal film conversion LUT. The input values may be, for example, grid points provided by dividing a data range of each RGB value output from the image-capturing element 21 into a plurality of stages at regular intervals. For example, when the data range is divided in 32 stages for each RGB, a plurality of input values are created, i.e. (R, G, B)=(R[0], G[0], B[0]), (R[0], G[0], B[1]), ... (R[0], G[0], B[31]), (R[0], G[1], B[0]), (R[0], G[1], B[1]), (R[0], G[1], B[31]), ... (R[31], G[31], B[0]), (R[31], G[31], B[1]), ..., (R[31], G[31], B[31]), wherein (R[0], G[0], B[0])=($R_{min}$, $G_{min}$, $B_{min}$) and (R[31], G[31], B [31])=($R_{max}$, $G_{max}$, $B_{max}$)

Next, the PC control unit 10 determines output values for the created input values. For example, when determining the output value for the input value (R[0], G[0], B[0]), the PC control unit 10 converts the input value (R[0], G[0], B[0])

into a reversal film tone image with the processings in steps S1 through S6 in FIG. 5 described above, in order to obtain tristimulus values X, Y, and Z. Then, the tristimulus values X, Y, and Z are converted into L*, a*, and b* with a known transformation formula. Consequently, (L*, a*, b*) which corresponds to conversion into the reversal film tone image can be determined for the input value (R[0], G[0], B[0]). In a similar manner, the output value (L*, a*, b*) is determined for each and every input value (R, G, B).

Then, the PC control unit 10 creates a set of each input value and its corresponding output value (an input/output data set) as the reversal film conversion LUT and stores it in the storage medium 12.

The PC control unit 10 uses the thus created reversal film conversion LUT to convert the RAW data (the RGB values) photographed by the digital camera 2 into the L*a*b* value which corresponds to conversion into the reversal film tone image. Then, the PC control unit 10 converts the converted L*a*b* value into a color space (RGB values) dependent on the display 3. Here, the PC control unit 10 performs this conversion based on a color profile describing a relationship between the color space L*a*b* independent of the display 3 and the color space RGB dependent on the display 3, for example.

Figure 6:
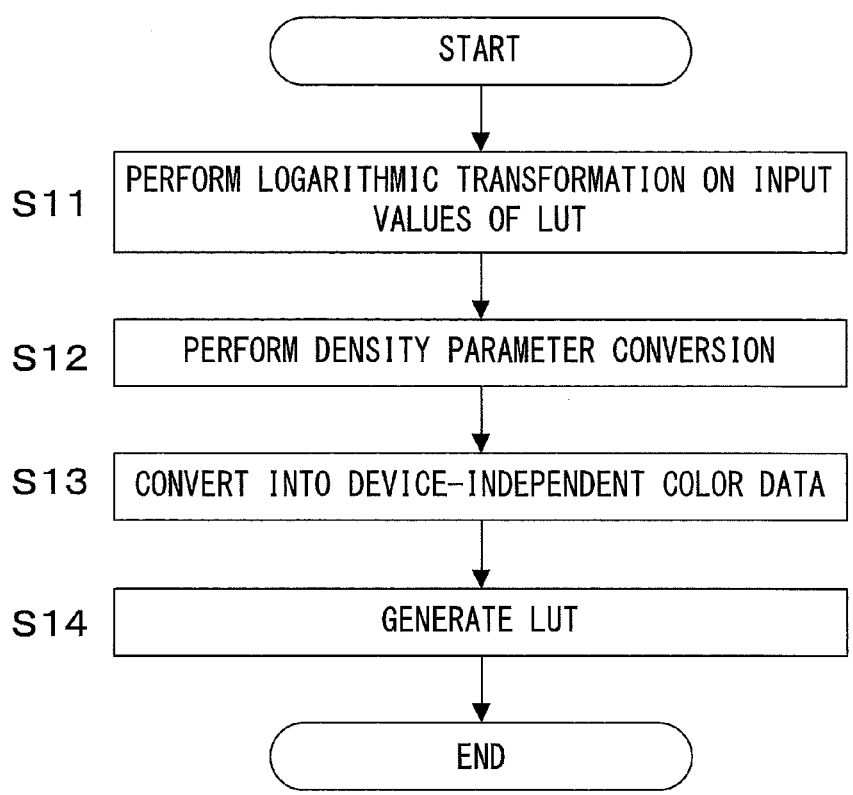
FIG. 6 A flowchart illustrating processings executed by a PC control unit in a second embodiment.

FIG. 6 is a flowchart illustrating a processing of creating a look-up table (a reversal film conversion LUT) for accepting input of the RAW data captured by the digital camera 2 and converting the RAW data into predetermined color data (L*a*b*).

In step S11, the PC control unit 10 outputs logarithmic transformation values ($R_{10}$, $G_{10}$, and $B_{10}$) by performing a logarithmic transformation on the input value of the look-up table.

In step S12, the PC control unit 10 converts the logarithmic transformation values output in step S11 into density parameters (C, M, and Y) indicating the densities of respective dyes in a transparent film (a positive film).

In step S13, the PC control unit 10 converts the converted density parameters in step 12 into device-independent color data (L*a*b*).

In step S14, the PC control unit 10 creates the look-up table (the reversal film conversion LUT), wherein the color data converted in step S13 is set as an output value of the look-up table.

Figure 7:
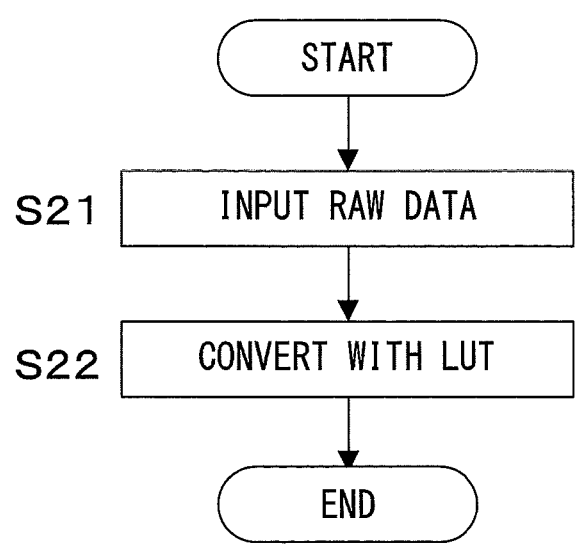
FIG. 7 A flowchart illustrating processings executed by a PC control unit in the second embodiment.

FIG. 7 is a flowchart illustrating a processing of using the reversal film conversion LUT to convert the RAW data (the RGB values) photographed by the digital camera 2 into a reversal film tone image.

In step S21, the PC control unit 10 inputs the RAW data captured by the digital camera 2.

In step S22, the PC control unit 10 performs a conversion on the RAW data input in step S21 with the look-up table (the reversal film conversion LUT) created in the above-described step S14.

According to the second embodiment as described above, the following operational advantages can be achieved.

(1) A computer program that creates the look-up table (the reversal film conversion LUT) for accepting input of RAW data captured by the digital camera 2 and converting the RAW data into predetermined color data (L*a*b*) is configured to cause the computer (the PC control unit 10) to execute a logarithmic transformation step of performing a logarithmic transformation on the input value of the look-up table to output logarithmic transformation values ($R_{10}$, $G_{10}$, and $B_{10}$); a density parameter conversion step of converting the logarithmic transformation values output in the logarithmic transformation step, into density parameters (C, M, and Y) indicating the densities of respective dyes in a transparent film (a positive film); a color data conversion step of converting the density parameters converted in the density parameter conversion step into device-independent color data (L*a*b*); and a look-up table creation step of creating the look-up table, wherein the color data converted in the color data conversion step is set as an output value of the look-up table. In this way, a reversal film tone appearance can be reproduced from the image data photographed by the digital camera 2 with a high accuracy.

(2) The computer program in the above-described item (1) is configured to cause the computer (the PC control unit 10) to further execute a RAW data input step of inputting RAW data captured by the digital camera 2; and an image conversion step of performing a conversion on the RAW data input in the RAW data input step with the look-up table created in the look-up table creation step. In this way, processing time involving the image conversion into the reversal film tone can be shortened in comparison with the first embodiment.

Third Embodiment

In a third embodiment, a case will be described in which the digital camera 2 executes the processings of steps S1 to S3 in FIG. 5 described above and the PC 1 executes the processings of step S4 and subsequent steps in accordance with a computer program. In the third embodiment, the description of the same parts as in the first and second embodiments will be omitted.

Specifically, after a subject image is captured by the image-capturing element 21, the camera control unit 22 of the digital camera 2 performs the processings of steps S1 to S3 in FIG. 5 described above on the captured RAW data to calculate density parameters C, M, and Y, pixel by pixel.

Then, the camera control unit 22 records the density parameters C, M, and Y of each pixel in the memory card 26.

The PC control unit 10 of the PC 1 executes an image processing described hereinafter, in accordance with the computer program stored in the memory in the PC control unit 10.

In this image processing, the PC control unit 10 first inputs the density parameters C, M, and Y of each pixel from the memory card 26 of the digital camera 2.

Then, the PC control unit 10 uses the density parameters C, M, and Y to perform the processings of steps S4 to S7 in FIG. 5 described above in order to convert the photographed image data of the digital camera 2 into a reversal film tone image.

It is assumed in the third embodiment that the above-described density conversion matrix has been previously stored in the storage medium 25 of the digital camera 2 and the above-described spectral density characteristic information has been previously stored in the storage medium 12 of the PC 1.

Figure 8:
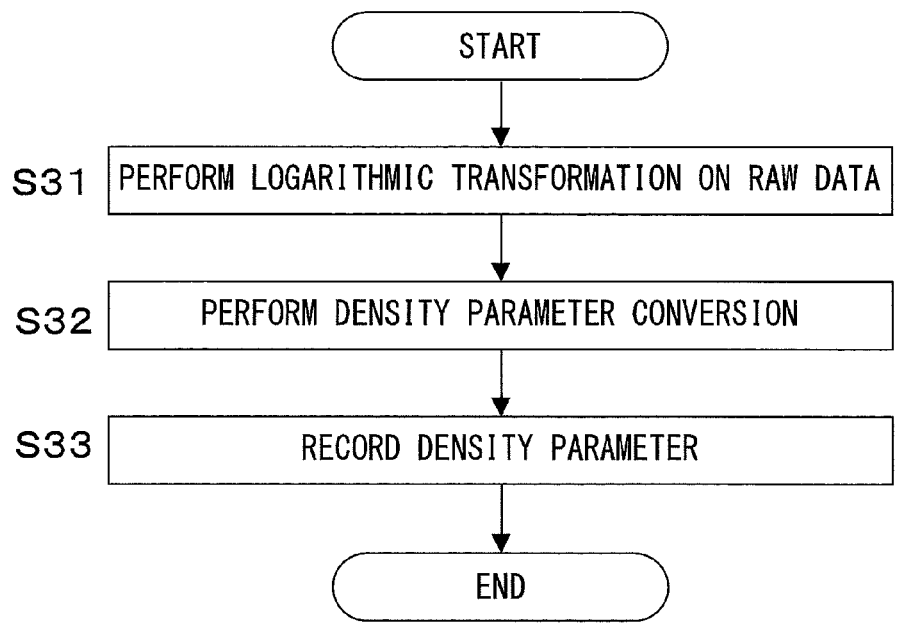
FIG. 8 A flowchart illustrating processings executed by a camera control unit in a third embodiment.

FIG. 8 is a flowchart illustrating processings executed by the camera control unit 22 of the digital camera 2 in the third embodiment. In step S31, the camera control unit 22 performs the logarithmic transformation on the RAW data captured by the image-capturing element 21 to output the logarithmic transformation values ($R_{10}$, $G_{10}$, and $B_{10}$).

In step S32, the camera control unit 22 converts the logarithmic transformation values output in step S31 into the density parameters (C, M, and Y) indicating the densities of respective dyes in the transparent film (the reversal film)

In step S33, the camera control unit 22 records the density parameters converted in step S32 in the memory card 26.

Figure 9:
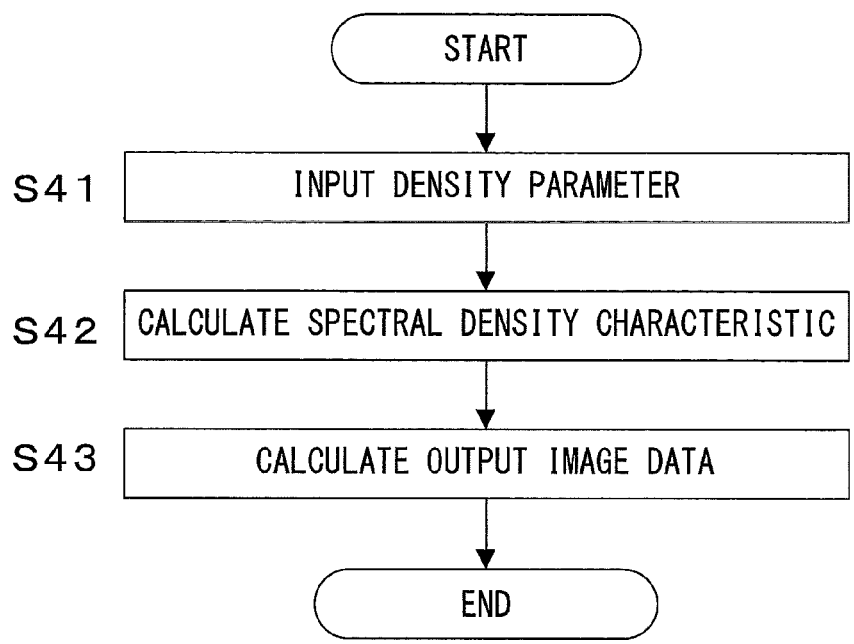
FIG. 9 A flowchart illustrating processings executed by a PC control unit in the third embodiment.

FIG. 9 is a flowchart illustrating processings executed by the PC control unit 10 of the PC 1 in the third embodiment. In step S41, the PC control unit 10 inputs the density parameters recorded in the memory card 26 by the digital camera 2.

In step S42, the PC control unit 10 calculates the spectral density characteristic D(2) of the transparent film corresponding to the density parameters input in step S41.

In step S43, the PC control unit 10 calculates predetermined output image data (RGB data dependent on the display), based on the spectral density characteristic of the transparent film calculated in step 42.

According to the third embodiment as described above, the following operational advantages can be achieved.

The digital camera 2 is configured to include the image-capturing element 21 that captures a subject image; the camera control unit 22 that performs a logarithmic transformation on RAW data captured by the image-capturing element 21 to output logarithmic transformation values ($R_{10}$, $G_{10}$, and $B_{10}$); the camera control unit 22 that converts the output logarithmic transformation values into density parameters (C, M, and Y) indicating the densities of respective dyes in a transparent film or transparency (a reversal film); and the camera control unit 22 that records the converted density parameters in the memory card 26. In addition, the computer program is configured to cause the computer (the PC control unit 10) to execute a density parameter input step of inputting density parameters recorded in the memory card 26 by the digital camera 2; a spectral density characteristic calculation step of calculating the spectral density characteristic $D(\lambda)$ of the transparent film corresponding to the density parameters input in the density parameter input step; and an output image calculation step of calculating predetermined output image data (RGB data dependent on the display) based on the spectral density characteristic of the transparent film calculated in the spectral density characteristic calculation step. In this way, a reversal film tone appearance can be reproduced from the image data photographed by the digital camera 2 with a high accuracy. In addition, the density parameters of the image data 2 have been previously determined in the digital camera 2, so that the one and same computer program can be used irrespective of types of cameras.

Fourth Embodiment

In a fourth embodiment, on the basis of the first embodiment described above, a case will be described in which the digital camera 2 records the parameter information (the factors a1 to a9 and n1 to n3) of the density conversion matrix in the same file as the RAW data. In the fourth embodiment, the description of the same parts as in the first to third embodiments will be omitted.

In the digital camera 2 in the fourth embodiment, the parameter information of the density conversion matrix has been previously stored in the storage medium 25. The camera control unit 22 reads out the parameter information of the density conversion matrix from the storage medium 25, when the camera control unit 22 records RAW data in the memory card 26. Then, the camera control unit 22 records the read out parameter information of the density conversion matrix in the same file as the RAW data, as metadata of the RAW data.

In execution of the image processing in the first embodiment described above (steps S1 through S7 in FIG. 5), the PC control unit 10 acquires the file of the RAW data from the digital camera 2 to acquire the parameter information of the density conversion matrix, along with the RAW data. Then, the PC control unit 10 uses the acquired parameter information of the density conversion matrix to perform the processing of step S3 in FIG. 5 described above.

Figure 10:
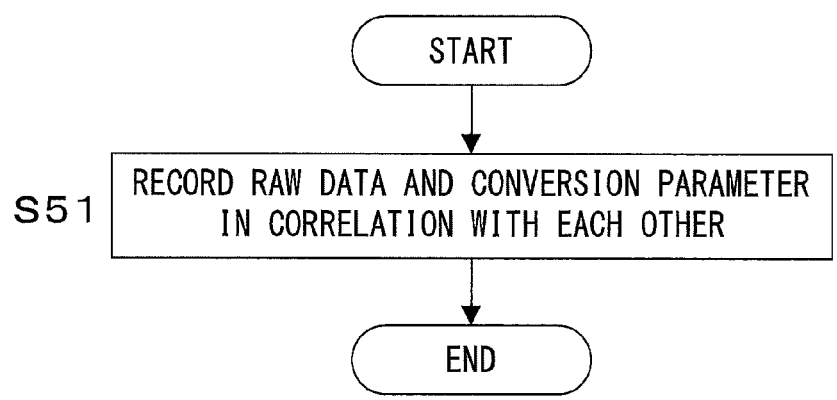
FIG. 10 A flowchart illustrating processings executed by a camera control unit in a fourth embodiment.

FIG. 10 is a flowchart illustrating processings executed by the camera control unit 22 of the digital camera 2 in the fourth embodiment. The storage medium 25 of the digital camera 2 stores conversion parameters (parameter information of the density conversion matrix) for converting the logarithmic transformation values, which are output by performing a logarithmic transformation on the RAW data captured by the image-capturing element 21, into density parameters indicating the densities of respective dyes in the transparent film (the reversal film). In step S51 in FIG. 10, the camera control unit 22 records the RAW data captured by the image-capturing element 21 and the conversion parameters stored in the storage medium 25, in correlation with each other, in the memory card 26.

Figure 11:
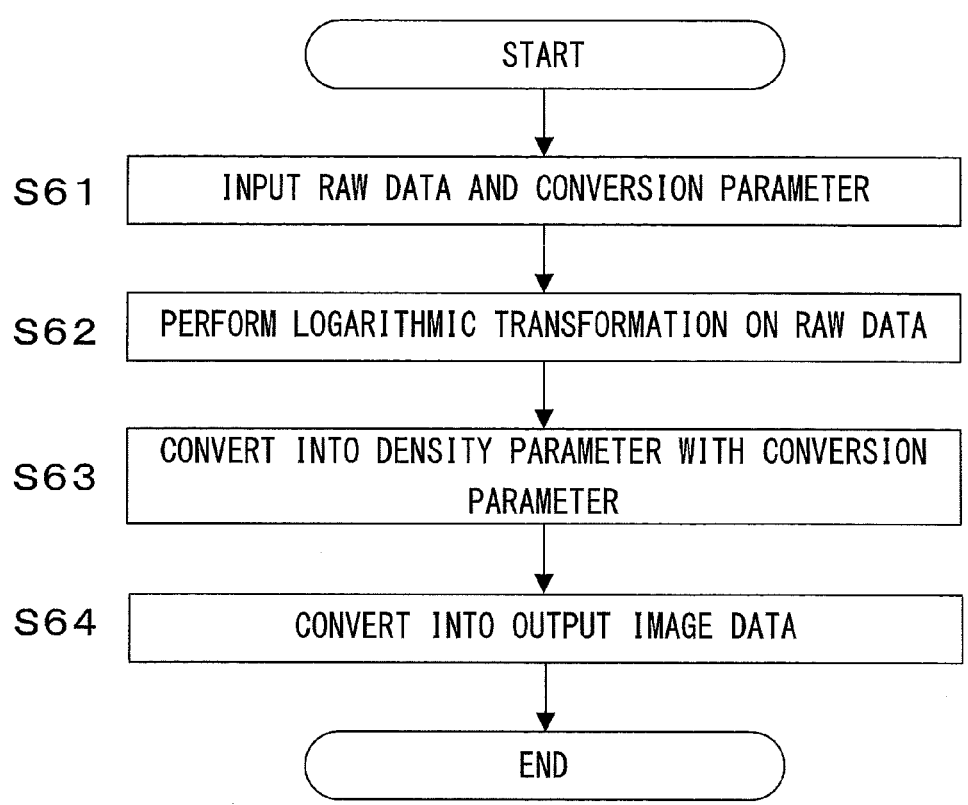
FIG. 11 A flowchart illustrating processings executed by a PC control unit in the fourth embodiment.

FIG. 11 is a flowchart illustrating processings executed by the PC control unit 10 of the PC 1 in the fourth embodiment. In step S61, the PC control unit 10 inputs the RAW data and the conversion parameters stored in the memory card 26 by the digital camera 2.

In step S62, the PC control unit 10 performs the logarithmic transformation on the RAW data input in step 61 to output logarithmic transformation values ($R_{10}$, $G_{10}$, and $B_{10}$).

In step S63, the PC control unit 10 uses the conversion parameters input in step S61 to convert the logarithmic transformation values output in step S62 into the density parameters (C, M, and Y).

In step S64, the PC control unit 10 converts the density parameters converted in step 63 into predetermined output image data (RGB data dependent on the display).

According to the fourth embodiment as described above, the following operational advantages can be achieved.

The digital camera 2 is configured to include the image-capturing element 21 that captures a subject image; the storage medium 25 that stores conversion parameters (parameter information of the density conversion matrix) for converting the logarithmic transformation values, which are output by performing a logarithmic transformation on the RAW data captured by the image-capturing element 21, into density parameters indicating the densities of respective dyes in the transparent film (the reversal film); and the camera control unit 22 that records the RAW data captured by the image-capturing element 21 and the conversion parameters, in correlation with each other, in the memory card 26. In addition, the computer program is configured to cause the computer (the PC control unit 10) to execute an input step of inputting the RAW data and the conversion parameters recorded by the digital camera 2 in the memory card 26; a logarithmic transformation step of performing a logarithmic transformation on the RAW data input in the input step to output logarithmic transformation values ($R_{10}$, $G_{10}$, and $B_{10}$); a density parameter conversion step of using the conversion parameters input in the input step to convert the logarithmic transformation values output in the logarithmic transformation step into the density parameters (C, M, and Y); and an image output step of converting the density parameters converted in the density parameter conversion step into predetermined output image data (RGB data dependent on the display). In this way, a reversal film tone appearance can be reproduced from the image data photographed by the digital camera 2 with a high accuracy. In addition, it is easily possible to support images photographed by various types of digital cameras 2 because it is not necessary to have previously stored the density conversion matrix of the digital camera 2 in the PC 1 running the computer program.

Fifth Embodiment

In a fifth embodiment, on the basis of the second embodiment described above, a case will be described in which the digital camera 2 records the parameter information (the factors a1 to a9 and n1 to n3) of the density conversion matrix in the same file as the RAW data. In the fifth embodiment, the description of the same parts as in the first to fourth embodiments will be omitted.

The digital camera 2 in the fifth embodiment is similar to the digital camera 2 in the fourth embodiment described above and the camera control unit 22 records parameter information of the density conversion matrix in the same file as the RAW data, as metadata of the RAW data.

In execution of the reversal film conversion LUT creation processing in the second embodiment described above, the PC control unit 10 acquires the file of the RAW data from the digital camera 2 to acquire the parameter information of the density conversion matrix, along with the RAW data. Then, the PC control unit 10 uses the acquired parameter information of the density conversion matrix to perform the processing of step S3 in FIG. 5 described above.

Figure 12:
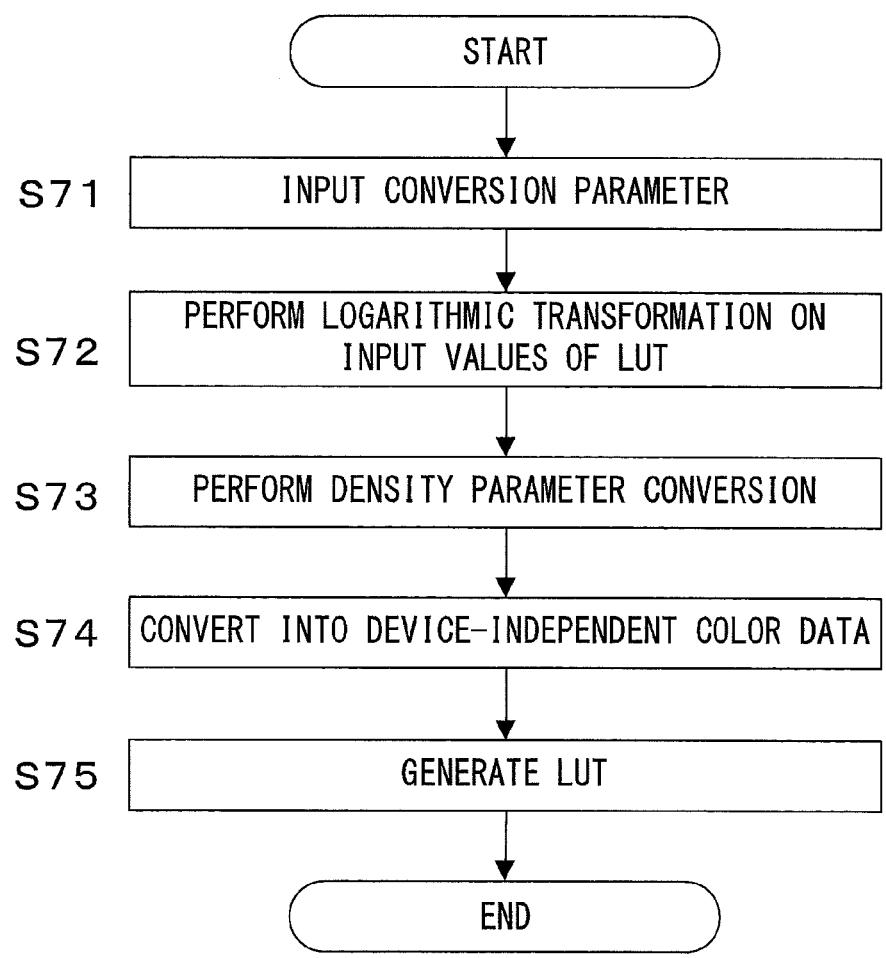
FIG. 12 A flowchart illustrating processings executed by a PC control unit in a fifth embodiment.
Figure 13:
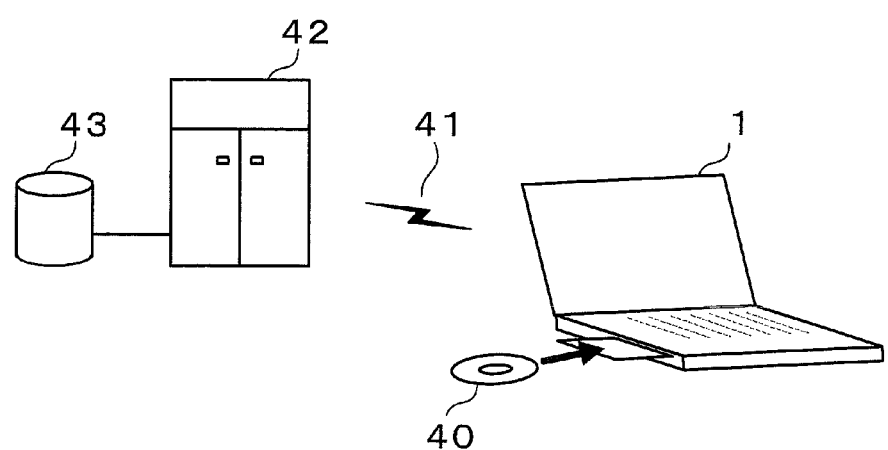
FIG. 13 A view illustrating an example of a configuration of a PC in a fourth variation.

FIG. 12 is a flowchart illustrating a processing of creating a look-up table (a reversal film conversion LUT) for accepting input of the RAW data captured by the digital camera 2 and converting the RAW data into predetermined color data (L*a*b*), in the fifth embodiment. In step S71, the PC control unit 10 inputs, from the digital camera 2, conversion parameters (parameter information of the density conversion matrix) for converting the logarithmic conversion values, which are output by performing a logarithmic transformation on the RAW data, into density parameters indicating the densities of respective dyes in the transparent film (the reversal film).

In step S72, the PC control unit 10 performs a logarithmic transformation on the input values of the look-up table to output logarithmic transformation values ($R_{10}$, $G_{10}$, and $B_{10}$).

In step S73, the PC control unit 10 uses the conversion parameters input in step S71 to convert the logarithmic transformation values output in step S72 into the density parameters (C, M, and Y).

In step S74, the PC control unit 10 converts the density parameters converted in step 74, into device-independent color data (L*a*b*).

In step S75, the PC control unit 10 creates the look-up table (the reversal film conversion LUT), wherein the color data converted in step S74 is set as an output value of the look-up table.

Furthermore, in the fifth embodiment, the PC control unit 10 performs a processing of converting the RAW data (the RGB values) photographed by the digital camera 2 into a reversal film tone image, with the reversal film conversion LUT created in step S75, in the same manner as the processing illustrated in FIG. 7.

According to the fifth embodiment described above, the following operational advantages can be achieved.

(1) The digital camera 2 is configured to include the image-capturing element 21 that captures a subject image; the storage medium 25 that stores conversion parameters (parameter information of the density conversion matrix) for converting the logarithmic transformation values, which are output by performing a logarithmic transformation on the RAW data captured by the image-capturing element 21, into density parameters indicating the densities of respective dyes in the transparent film (the reversal film); and the camera control unit 22 that records the RAW data captured by the image-capturing element 21 and the conversion parameters, in correlation with each other, in the memory card 26. In addition, a computer program that creates a look-up table (a reversal film conversion LUT) for accepting input of RAW data captured by the digital camera 2 and converting the RAW data into predetermined color data (L*a*b*) is configured to cause the computer (the PC control unit 10) to execute a conversion parameter input step of inputting conversion parameters recorded in the memory card 26 by the digital camera 2; a logarithmic transformation step of performing a logarithmic transformation on the input values of the look-up table to output logarithmic transformation values ($R_{10}$, $G_{10}$, and $B_{10}$); a density parameter conversion step of using the conversion parameters input in the conversion parameter input step to convert the logarithmic transformation values output in the logarithmic transformation step into density parameters (C, M, and Y); a color data conversion step of converting the density parameters converted in the density parameter conversion step into device-independent color data (L*a*b*); and a look-up table creation step of creating the look-up table, wherein the color data converted in the color data conversion step is set as an output value of the look-up table. In this way, a reversal film tone appearance can be reproduced from the image data photographed by the digital camera 2 with a high accuracy. In addition, it is easily possible to support images photographed by various types of digital cameras 2 because it is not necessary to have previously stored the density conversion matrix of the digital camera 2 in the PC 1 running the computer program.

(2) The computer program in the above-described item (1) is configured to cause the computer (the PC control unit 10) to further execute a RAW data input step of inputting RAW data captured by the digital camera 2; and an image conversion step of performing a conversion on the RAW data input in the RAW data input step, with the look-up table created in the look-up table creation step. In this way, processing time involving the reversal film tone image conversion can be shortened in comparison with the first embodiment.

Sixth Embodiment

In a sixth embodiment, a case will be described in which the digital camera 2 executes the image processing of converting into a reversal film tone image as described above (FIG. 5). In the sixth embodiment, the description of the same parts as in the first to fifth embodiments will be omitted.

After a subject image is captured by the image-capturing element 21, the camera control unit 22 of the digital camera 2 uses RAW data obtained by the image-capturing element 21 to execute the processing of steps S1 through S7 in FIG. 5 described above. Then, the camera control unit 22 records the image data after this image processing in the memory card 26. It is assumed in the sixth embodiment that the density conversion matrix and the spectral density characteristic information of the reversal film have been previously stored in the storage medium 25 of the digital camera 2.

According to the sixth embodiment described above, the following operational advantages can be achieved.

The digital camera 2 is configured to include the image-capturing element 21 that captures a subject image; the camera control unit 22 that performs a logarithmic transformation on RAW data captured by the image-capturing element 21 to output logarithmic transformation values ($R_{10}$, $G_{10}$, and $B_{10}$); the camera control unit 22 that converts the output logarithmic transformation values into density parameters (C, M, and Y) indicating the densities of respective dyes in a transparent film (a reversal film); and the camera control unit 22 that converts the thus converted density parameters into predetermined output image data (RGB data dependent on the display). In this way, a reversal film tone appearance can be reproduced from the image data photographed by the digital camera 2 with a high accuracy.

(First Variation)

In the above-described embodiments, reproduction of a variety of reversal film brands may be achieved. In this case, the spectral density characteristic information used in the processing of step S4 in FIG. 5 described above is replaced by spectral density characteristic information and conversion parameters (parameter information of the density conversion matrix) corresponding to a desired reversal film brand, in order to perform the processing. In this way, reproduction of a variety of reversal film brands can be achieved from one image data photographed by the digital camera 2.

(Second Variation)

In the second and fifth embodiments described above, the case has been described in which the color space of the output values of the reversal film conversion LUT is the L*a*b* color space. However, the color space of the output values is not limited to this and may be another color space, such as a L*u*v* color space. Additionally, the tristimulus values X, Y, and Z may be set as output values of the reversal film conversion LUT.

(Third Variation)

In the above-described embodiments, the case has been described in which the image data converted into the reversal film tone is output to the display 3. However, the image output equipment is not limited to this, but may be a printer, for example. In this case, the image data (such as XYZ values or L*a*b* values) after conversion into be the reversal film tone may be converted into values of a color space dependent on the characteristics of the image output equipment.

(Fourth Variation)

In the above-described embodiments, the case has been described in which the program for causing the PC control unit 10 to execute the processings is stored in the memory of the PC control unit 10. However, loading the program to the PC 1 may be accomplished by setting a storage medium 40, such as a CD-ROM having the program stored therein, in the PC 1 as illustrated in FIG. 6, or by loading the program to the PC 1 via a communication line 41 such as a network. In the case of loading via the communication line 41, the program has been stored in a hard disk device 43 of a server (a computer) 42 connected to the communication line 41 and the program is provided to the PC 1 as signals. The program may be supplied as a variety of forms of computer program products, e.g. provided in the storage medium 40 or via the communication line 41.

(Fifth Variation)

Although in the above-described embodiments the case has been described in which tone appearance of a color transparent film or transparency (reversal film) is reproduced, the present invention may also be applied to a case where tone appearance of a monochromic transparent film is reproduced.

(Sixth Variation)

Although in the first, third, fourth, and sixth embodiments described above the case has been described in which the RAW data is converted into device-dependent image data (RGB data dependent on the display) for outputting, the RAW data may be converted into as device-independent image data for outputting.

(Seventh Variation)

Although in the second and fifth embodiments described above the case has been described in which the LUT for converting the RAW data into the device-independent color data (the L*a*b* values) is created, a LUT for converting the RAW data into device-dependent color data may be created.

(Eighth Variation)

The PC control unit 10 of the PC 1 may be configured to input the RAW data from the digital camera 2, perform the processing of steps S1 through S3 in FIG. 5 described above, calculate the density parameters C, M, and Y for each pixel, and execute the processing of recording the density parameters C, M, and Y for each pixel in the storage medium, in accordance with a computer program. Then, a PC control unit of another PC may read out the density parameters C, M, and Y from the storage medium and perform the processings of steps S4 through S7 in FIG. 5 described above, so that the photographed image data of the digital camera 2 is converted into the reversal film tone image.

Figure 14:
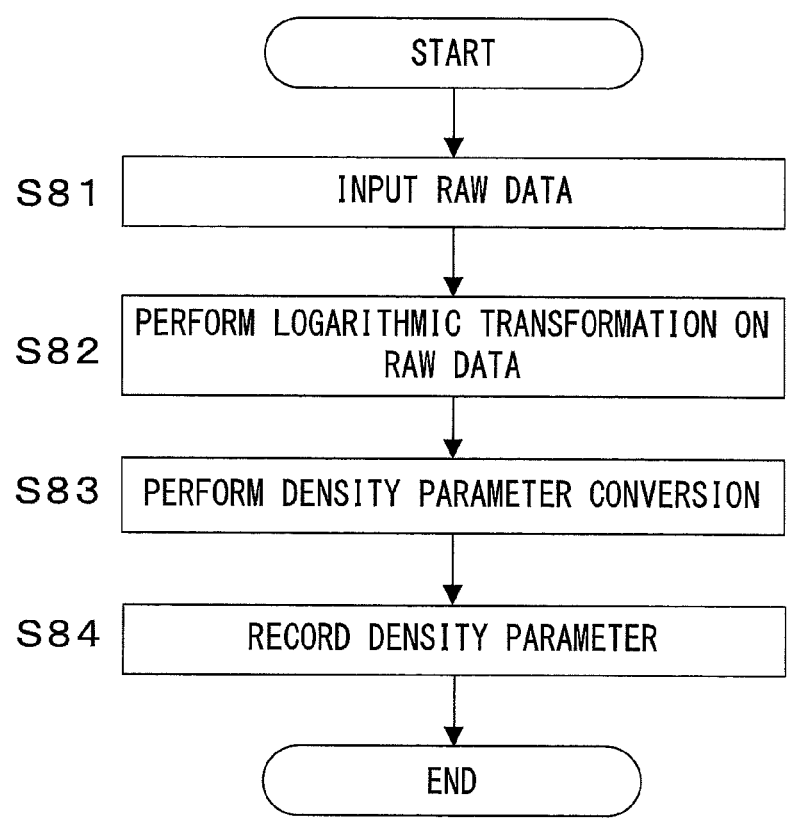
FIG. 14 A flowchart illustrating processings executed by the PC control unit in an eighth variation.

FIG. 14 is a flowchart illustrating processings executed by the PC control unit 10 of the PC 1 in the eighth variation. In step S81, the PC control unit 10 inputs the RAW data captured by the digital camera 2.

In step S82, the PC control unit 10 performs the logarithmic transformation on the RAW data input in step S81 to output logarithmic transformation values ($R_{10}$, $G_{10}$, and $B_{10}$).

In step S83, the PC control unit 10 converts the logarithmic transformation values output in step 82 into density parameters indicating the densities of respective dyes in a transparent film.

In step S84, the PC control unit 10 records the density parameters converted in step S83 in a storage medium.

(Ninth Variation)

The PC control unit 10 of the PC 1 may be configured to execute a processing of creating a LUT that accepts input of the density parameters C, M, and Y and outputs device-dependent color data (for example, display RGB data) or device-independent color data (for example, L*a*b* values), in accordance with a computer program. In this case, the PC control unit 10 first creates input values (density parameters C, M, and Y) of the LUT. The input values may be, for example, grid points provided by dividing a data range of density parameters C, M, and Y into a plurality of stages at regular intervals. Then, the PC control unit 10 uses the processings of steps S4 through S7 in FIG. 5 described above to determine color data (for example, display RGB data) which is an output value of the LUT, for each created input value (density parameters C, M, and Y). The PC control unit 10 creates a set of each input value (density parameters C, M, and Y) and its corresponding output value (color data) as the LUT and stores it in the storage medium 12.

The PC control unit 10 reads out the density parameters C, M, and Y of each pixel recorded in the memory card 26 by the digital camera 2 in the above-described third embodiment, for example, and converts the density parameters C, M, and Y into color data (for example, display RGB data) with the created LUT. Consequently, a reversal film tone image can be output to the display 3.

Figure 15:
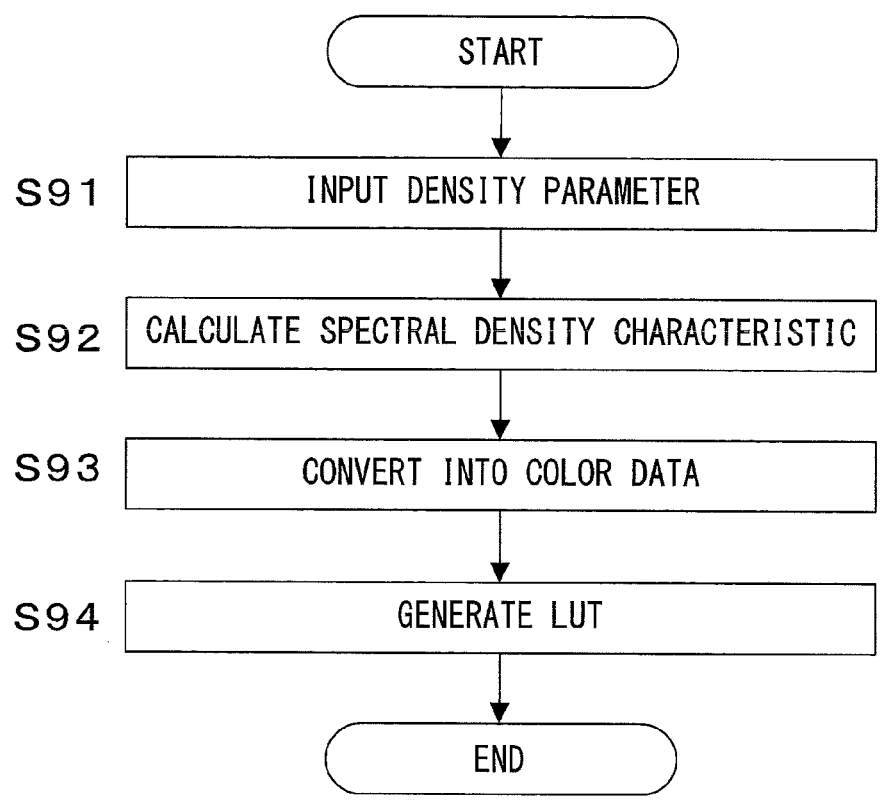
FIG. 15 A flowchart illustrating processings executed by the PC control unit in a ninth variation.

FIG. 15 is a flowchart illustrating the processing of creating a LUT that accepts input of the density parameters C, M, and Y and outputs device-dependent color data (for example, display RGB data) or device-independent color data (for example, L*a*b* values), in the ninth variation. In step S91, the PC control unit 10 inputs density parameters.

In step S92, the PC control unit 10 calculates the spectral density characteristic of the transparent film corresponding to the density parameters input in step S91.

In step S93, the PC control unit 10 converts the spectral density characteristic of the transparent film calculated in step S92, into device-dependent or device-independent color data.

In step S94, the PC control unit 10 creates a look-up table, wherein the color data converted in step S93 is set as an output value of the look-up table.

(Tenth Variation)

In the above-described embodiments, measured values of the spectral density characteristics of the cyan, magenta, and yellow layers of the reversal film have been prepared in advance as shown in FIG. 4 and the spectral densities of the cyan, magenta, and yellow layers have been correlated with the density parameters C, M, and Y. Additionally, the correlation (the density conversion matrix) between the density parameters C, M, and Y and the RAW data has been previously determined from the photographed data of the color patch, for example. In conversion of the captured image into the reversal film tone, the correlation (the density conversion matrix) previously determined as described above is used to convert the RAW data of the captured image to be converted, into the density parameters C, M, and Y. Then, tristimulus values X, Y, and Z are calculated from the spectral density characteristics corresponding to the converted density parameters C, M, and Y. In this way, in the above-described embodiments, image reproduction having a color tone more similar to a reversal film color tone is achieved with the image conversion based on the spectral density characteristics. However, the image reproduction having a color tone similar to a reversal film color tone can be achieved, not only with the image conversion based on the spectral density characteristics, but also with an image conversion based on spectral transmittance characteristics.

For example, measured values of the spectral transmittance characteristics of the cyan, magenta, and yellow layers of the reversal film have been previously prepared. In a similar manner to the case of the spectral density characteristics described above, for example, the reversal film may be exposed and developed with change in density of only one of dyes, in order to create a chart and perform spectral measurement of the chart.

Then, transmittance parameters Ct, Mt, and Yt corresponding to the spectral transmittances of the cyan, magenta, yellow layers are given. Correlation information between the transmittance parameters Ct, Mt, and Yt and the spectral transmittance characteristics of respective dyes (cyan, magenta, and yellow) of the reversal film, and information about a spectral transmittance characteristic of the base of the reversal film have been previously stored as spectral transmittance characteristic information in the storage medium 12 in the PC 1.

In addition, a color chart having a plurality of color patches is photographed with both the reversal film and the digital camera 2. Then, based on both data obtained by measuring the spectral transmittance of the reversal film after development and image data photographed by the digital camera 2, the correlation between the RAW data and the transmittance parameters Ct, Mt, and Yt is determined.

For example, in a similar manner to the above-described embodiment, a transmittance conversion matrix is determined for converting the RGB values of the RAW data into the transmittance parameters Ct, Mt, and Yt of respective colors. Information about the correlation between the RAW data and the transmittance parameters Ct, Mt, and Yt (transmittance conversion matrix) has also been stored in the storage medium 12 of the PC 1.

When the RAW data of the captured image to be converted is converted into reversal film tone, an image conversion is performed with the spectral transmittance characteristic information stored in the storage medium 12 and the transmittance conversion matrix.

Figure 16:
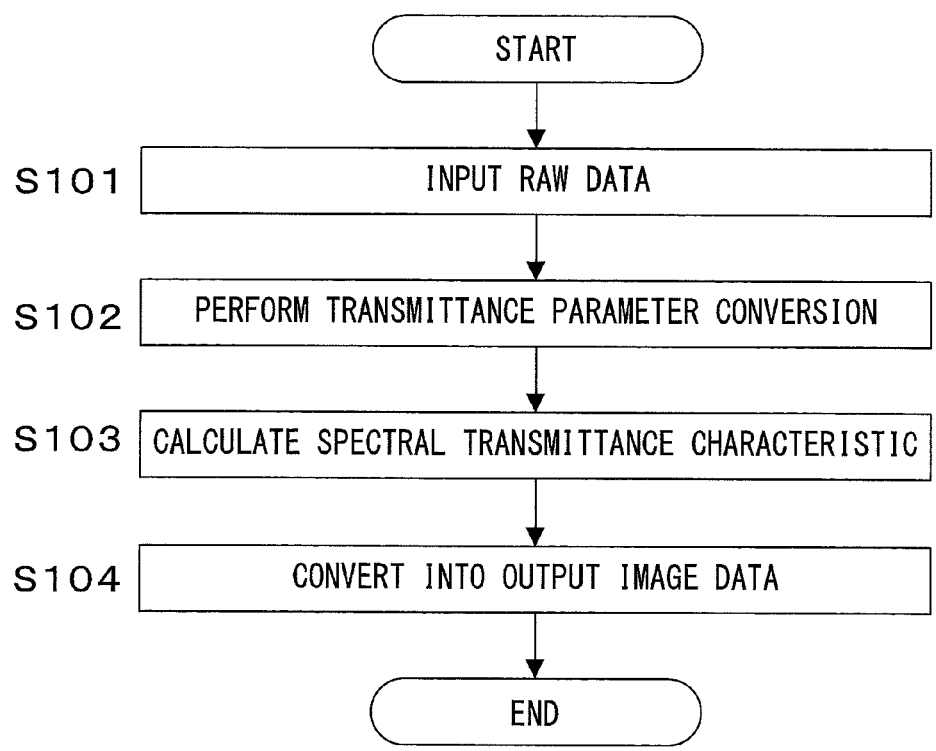
FIG. 16 A flowchart illustrating processings executed by the PC control unit in a tenth variation.

FIG. 16 is a flowchart illustrating the processing of converting the RAW data into the reversal film tone in the tenth variation. In step S101, the PC control unit 10 inputs the RAW data captured by the digital camera 2.

In step S102, the PC control unit 10 converts the RGB values of the RAW data into the transmittance parameters Ct, Mt, and Yt, with the transmittance conversion matrix stored in the storage medium 12. Here, before step S102 and after step S101, a gradation conversion for fine-tuning of the color tone may be performed.

In step S103, the PC control unit 10 determines a spectral transmittance characteristic $Tc(\lambda)$ of the cyan layer, a spectral transmittance characteristic $Tm(\lambda)$ of the magenta layer, and a spectral transmittance characteristic $Ty(\lambda)$ of the yellow layer, based on the transmittance parameters Ct, Mt, and Yt converted in step S102 and the spectral transmittance characteristic information stored in the storage medium 12. Then, the PC control unit 10 calculates an overall spectral transmittance characteristic $T(\lambda)$ of the reversal film based on the spectral transmittance characteristics $Tc(\lambda)$, $Tm(\lambda)$, and $Ty(\lambda)$ of respective layers (cyan, magenta, and yellow), by the following equation (15).

$$T(\lambda)=Tc(\lambda)\cdot Tm(\lambda)\cdot Ty(\lambda)\cdot Tb(\lambda) \tag{15}$$

In step S104, the PC control unit 10 calculates tristimulus values X, Y, and Z by the following equations (16) to (18), based on the overall spectral transmittance characteristic $T(\lambda)$ of the reversal film. In the following equations (16) to (18), $I(\lambda)$ denotes a spectral characteristic of the observation light source, and $x(\lambda)$, $y(\lambda)$, and $z(\lambda)$ denote color matching functions.

$$X=\int\{I(\lambda)\cdot T(\lambda)\cdot x(\lambda)\}d\lambda \tag{16}$$

$$Y=\int\{I(\lambda)\cdot T(\lambda)\cdot y(\lambda)\}d\lambda \tag{17}$$

$$Z=\int\{I(\lambda)\cdot T(\lambda)\cdot z(\lambda)\}d\lambda \tag{18}$$

Then, the PC control unit 10 converts the calculated tristimulus values X, Y, and Z into predetermined output image data (for example, RGB data dependent on the display), with a predetermined transformation formula.

In this way, the image reproduction having a color tone more similar to a reversal film color tone can be achieved with the image conversion based on the spectral transmittance characteristics, as in the case of the image conversion based on the spectral density characteristics.

The camera control unit 22 of the digital camera 2 may be configured to perform the processings of steps S101 through S104 in FIG. 16 described above with the RAW data captured by the image-capturing element 21.

The forgoing description is merely illustrative and the present invention is not limited to configurations of the above-described embodiments. The configurations of the variations may also be combined with the above-described embodiments, as required. Other aspects conceivable within the technical ideas of the present invention are also included in the scope of the present invention.

The disclosure of the following priority application is herein incorporated by reference:

Japanese Patent Application No. 2012-192911 filed Sep. 3, 2012

REFERENCE SIGNS LIST

1 . . . PC, 2 . . . digital camera, 3 . . . display, 10 . . . PC control unit, 12, 25 . . . storage medium, 21 . . . image-capturing element, 22 . . . camera control unit, 26 . . . memory card

The invention claimed is:

1. An image processing device, comprising:
one or more processors programmed to
convert a pixel value of RAW data of an image captured by an image-capturing device into a logarithmic value of the pixel value;
convert the converted logarithmic value into a density parameter based upon conversion information; and
convert the converted density parameter into predetermined output image data, wherein
the conversion information has been calculated from a color tone of an image that is made by capturing a subject, and a color tone of a reversal film that is made by capturing the subject.

2. The image processing device according to claim 1, wherein:
the subject has a plurality of colors; and
the conversion information has been calculated from image data that is made by capturing the subject having a plurality of colors and colorimetric data of the reversal film that is made by capturing the subject having a plurality of colors.

3. The image processing device according to claim 2, wherein:
the subject having a plurality of colors is a color chart.

4. The image processing device according to claim 3, wherein:
the conversion information has been calculated so as to reduce a difference between image data converted from the image data that is made by capturing the color chart using the conversion information and the colorimetric data of the reversal film that is made by capturing the color chart.

5. The image processing device according to claim 1, wherein:
a plurality of the image conversion information corresponding to a plurality of the reversal films is stored in a memory.

6. An image processing method, comprising:
a first converting step of converting a pixel value of RAW data of an image captured by an image-capturing device into a logarithmic value of the pixel value;
a second converting step of converting the logarithmic value converted in the first converting step into a density parameter based upon conversion information; and
a third converting step of converting the density parameter converted in the second converting step into predetermined output image data, wherein
the conversion information has been calculated from a color tone of an image that is made by capturing a subject, and a color tone of a reversal film that is made by capturing the subject.

* * * * *